United States Patent

Parrish

[15] 3,637,458

[45] Jan. 25, 1972

[54] MICROCELLULAR FOAM SHEET

[72] Inventor: Robert Guy Parrish, Newark, Del.

[73] Assignee: E. I. du Pont de Nemours and Company, Wilmington, Del.

[22] Filed: Dec. 27, 1968

[21] Appl. No.: 797,312

Related U.S. Application Data

[63] Continuation-in-part of Ser. No. 664,781, Aug. 31, 1967, abandoned.

[52] U.S. Cl. ..............................161/160, 161/159, 264/53, 264/55
[51] Int. Cl. ....................B32b 3/00, B32b 7/00, B29d 27/00
[58] Field of Search.........................264/41, 55, 53, 95, 176; 161/159, 160

[56] References Cited

UNITED STATES PATENTS

| | | | |
|---|---|---|---|
| 3,177,109 | 4/1965 | Ziegler | 264/41 |
| 3,227,784 | 1/1966 | Blades et al | 264/176 |
| 3,277,221 | 10/1966 | Parrish | 264/95 |
| 3,458,608 | 7/1969 | Russell et al | 264/55 |
| 3,466,353 | 9/1969 | Turner | 264/53 |

Primary Examiner—William J. Van Balen
Attorney—Donald W. Huntley

[57] ABSTRACT

A low-density foam sheet of a high work-to-break value thermoplastic crystalline polymer comprising polyhedral-shaped closed cells having a median diameter of at least 500 microns and a process for its preparation by flash extrusion with reduced bubble nuclei formation.

7 Claims, 8 Drawing Figures

INVENTOR
ROBERT G. PARRISH

BY
ATTORNEY

INVENTOR
ROBERT G. PARRISH

BY
ATTORNEY

INVENTOR
ROBERT G. PARRISH

MICROCELLULAR FOAM SHEET

CROSS-REFERENCE TO RELATED APPLICATION

This case is a continuation-in-part of my copending application, Ser. No. 664,781, filed Aug. 31, 1967 and now abandoned.

BACKGROUND OF THE INVENTION

Foams of various synthetic polymers have enjoyed widespread acceptance in various applications such as insulating, packaging, and cushioning. In general, however, foams previously available to the art were somewhat deficient in one or more respects including flexibility, tensile strength and resistance to shock.

Ultramicrocellular products having many of the attributes desired in foam sheet material have recently become available through Blades and White, U.S. Pat. No. 3,227,664. The products described therein exhibit superior tensile strength, food flexibility and high opacity at low basis weights. The closed-cell species also provides shock protection, excellent gas retention and other desirable properties, all at low apparent densities. The Blades and White foams exhibit polyhedral cells defined by filmy cell walls, a very high level of orientation of the polymer in the cell wall as evidenced by uniplanar orientation of the polymer crystallites, and a high degree of perfection of the cell walls as evidenced by a uniform texture.

SUMMARY OF THE INVENTION

The instant invention provides low-density foams which exhibit the desirable properties previously characteristic of certain foams, and, in addition, demonstrate greater work-to-tear values and substantially more balanced tensile strength in their machine and transverse directions than have previously been available. Specifically, there is provided a foam sheet of a linear, thermoplastic crystalline polymer of film forming molecular weight and substantially free from cross-linking, the polymer having a work-to-break value of at least 10,000 in.-lbs./in.$^3$, the foam sheet consisting essentially of polyhedral shaped closed cells whose median diameter is at least 500 microns, the cell walls being characterized by a nonuniform texture, and the foam having a maximum density of 0.30 g./cc. There are also provided laminar structures comprising the foam sheets having at least one polymeric film bonded thereto.

There is further provided an extrusion process for the production of the above foam sheet which comprises preparing a solution of a synthetic, crystalline organic polymer in an activating liquid, the activating liquid having a boiling point at least 25° C. below the melting point of the polymer and being a solvent for the polymer at the extrusion conditions while dissolving less than 1 percent of the polymer at temperatures up to the normal solvent boiling point, the solution having a temperature prior to extrusion greater than the freezing point of the solution and below that temperature where adiabatic evaporation of all the activating liquid present will produce insufficient cooling for solid polymer precipitation, and below the self-nucleating temperature of the activating liquid and below the fibrillation temperature of the solution, and the concentration of activating liquid prior to extrusion being between 98 percent by weight and a minimum amount sufficient to precipitate solid polymer on adiabatic evaporation; extruding the solution into a region of substantially lower pressure and temperature whereby vaporization of the activating liquid rapidly cools the solution to the temperature at which solid polymer precipitates and freezes in the polymer orientation.

Preferably, the activating liquid comprises at least one impermeant inflatant to facilitate the spontaneous reinflating of the foam.

DESCRIPTION OF THE PREFERRED EMBODIMENTS

Figure 1:
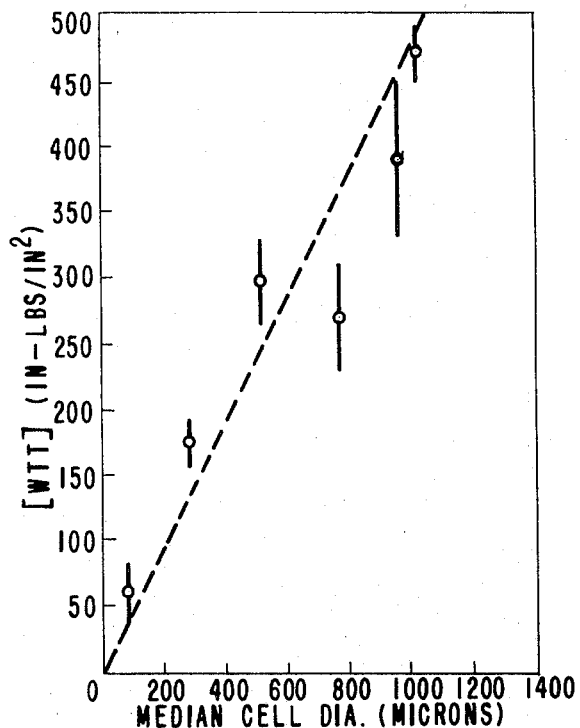
FIG. 1 is a graphical illustration of the dependence of the work-to-tear values on the cell size.

The foam products of the instant invention, as indicated above, are characterized by a median cell diameter of at least 500 microns and nonuniform texture in the cell walls, in contrast to the ultramicrocellular products described in Blades et al., U.S. Pat. No. 3,227,664. It has surprisingly been discovered that interchanging the uniform texture characteristics of the Blades et al. products for large cell size leads to foam sheet products with unprecedented high tear strength. In addition, the foam sheets of the instant invention have substantially balanced tear strength in both the machine and transverse directions of the sheet. These improved characteristics are obtained without sacrificing the desirable qualities of high tensile strength, good flexibility, and low density.

Polymers which can be used in this invention include crystallizable, linear, organic polymers substantially free from cross-linking such as polyhydrocarbons (e.g., linear polyethylene, isotactic polypropylene), polyesters (e.g., polyethyleneterephthalate), and polyamides. The polymers should be of at least film forming molecular weight and have a work-to-break (WTB) value of at least 10,000 in.-lbs./in.$^3$.

WTB values are generally given as weighted averages of published as well as subsequently determined values on various commercial and experimental film samples of these polymers. The values for highly oriented biaxially drawn films were given somewhat greater weight since these are most likely to approximate the structure of the actual cell walls in foam sheets. In any case, the range of values observed for any given polymer is relatively small, since as samples become more highly oriented, elongation is "traded" for tensile strength at such a rate that the area under the stress-strain curve, i.e., the (WTB)$_f$, remains roughly constant. These values are thus primarily characteristic of the particular polymer in question, and only secondarily of the "fine structure," e.g., orientation, crystallinity, etc., of the sample. Accordingly, representative WTB values for isotactic polypropylene and linear polyethylene are 10,000 and 11,000 in.-lbs./in.$^3$, respectively. In contrast, branched polyethylene and polystyrene exhibit values of 7,000 and 250 in.-lbs./in.$^3$.

Foam sheets of this invention have a median cell diameter of at least about 500 microns. Preferably, the median cell diameter is in the order of 1,000 microns and diameters as high as about 2,000 microns can be obtained. In general, cell wall thickness lies in the order of 0.5 to 3.0 microns. Since the individual cells are not all the same size, and since they are polyhedral rather than spherical, the following somewhat arbitrary procedure is employed to determine cell size. With a new razor blade, cut several small samples (approximately ½×½ inch) from various areas of the foam sheet. Section each sample in the desired plane. Mount each section on a glass microscope slide with the newly generated foam surface toward the top so as to lend itself to microscopic examination. Stain that surface. Place the prepared slide under a microscope and focus on the plane of that surface. Measure, by means of a calibrated reticule, the largest dimension in a given direction of each cell in the sample. Rotate the sample 90°, and measure the largest dimension of each cell in the transverse direction. Collect at least 100 measurements on the basis on 25 measurements per section. The various fractiles may be calculated according to the method described in Section 16-3, page 388 of "Introduction to the Theory of Statistics" by Alexander McFarlane Mood (McGraw-Hill, Inc., 1950). The median value, which corresponds to fractile 0.50, is referred to herein as the median cell diameter.

In order to illustrate graphically the dependence of work-to-tear on cell size, the data for several samples of isotactic polypropylene foam sheets are plotted in FIG. 1. Data for the products of examples 1 and 4, as hereinafter described, are combined with data obtained on similarly prepared samples having intermediate cell sizes. The experimental median cell diameter is plotted versus $[WTT]_s$, the specific work-to-tear per unit length per unit polymer thickness. The length of the vertical bars at each point is an estimate of the experimental uncertainty in the value. In spite of some scatter of the points, the relationship between these parameters fits fairly well as a straight line. Some of the scatter of the points is believed to be based on nonequivalent fine structures (e.g., differences in degree of molecular orientation), or on the presence of macroimperfections in some of the samples leading to low tear values.

The lowest point of FIG. 1 at a $[WTT]_s$ value of 60 in.-lbs./in.$^2$ is typical of the prior art small cell polyhydrocarbon foam sheets. For further comparison with the high values (e.g., greater than 250 in.-lbs./in.$^2$ observed for the products of this invention, one may cite values of 70, 80, 120, 120 and 70 for "Ololite," "Oloflex," "Xanfoam," "Sekisui" and "Celluliner," respectively, (commercial polystyrene foams) and 200 for "Cocafoam" (commercial polyurethane foam).

The density of the foam sheet in the instant products is another important variable. It is obvious, of course, that for a given area and thickness of sheet (as might be required to wrap and protect a given article), the lower the density the smaller will be the quantity of polymer in the sheet, and consequently the lower the raw materials cost. Beyond that, low density plays a large role in providing a sheet with sufficient flexibility. It is unfortunately true that the preferred polymers with high WTB values, (e.g., linear polyethylene and isotactic polypropylene, desired to provide high tear strength), inherently possess high Young's moduli compared to other polymers (such as branched polyethylene). This high polymer modulus tends to lead to low sheet flexibility, but may be compensated for by keeping the density of the foam sheet low. For these reasons densities of 0.03 g./cc. or lower are required, and densities less than 0.015 g./cc. are preferred. Under these conditions the Young's modulus, measured at an angle of 0.262 radians and a beam length of 1 mm., may be held below a few hundred g./cm.$^2$ (cf. R. J. Roark, Formulas for Stress and Strain, McGraw-Hill Company, Inc., 1965, Chapter 8).

The density of these foam sheets can be determined as follows. First, in order to avoid erroneous values which would be obtained if the cells of the sample have been partially collapsed by prior mechanical treatments, etc., the cells are fully inflated by immersing the sample at room temperature in a bath of fluorotrichloromethane for 5 minutes followed by immersion for 15 minutes in a bath of equal volumes of fluorotrichloromethane and dichlorotetrafluoroethane followed by drying in a circulating air oven at 50° C. for 5 minutes. The volume of a convenient quantity of this inflated sample is determined by the well-known water displacement technique (taking care to avoid trapping any external air bubbles). The weight of the polymer in the sample is then determined by destroying the cellular structure by pressing it twice, for 10 and 5 seconds respectively, at a pressure of 2000 p.s.i.g. and a temperature of 210° C., and weighing the resulting film. The foam sheet density is, of course, the polymer weight divided by the sample volume.

A further criterion of the foam sheets of this invention is that they be comprised of closed cells. Such cells will be able to confine a quantity of gas (air) so that a pneumatic "springy" response to applied loads is obtained. This feature provides the resiliency required for shock absorption and surface protection when these sheets are employed as protective wrapping materials. For purposes of this invention a closed-cell sheet is defined to mean that at least a majority proportion by number of cells in any such sample possesses a plurality of defining walls, i.e., unruptured walls, which wholly encapsulate an inner space or void. For practical purposes mere visual or microscopic examination will often readily reveal whether or not a particular cellular structure predominates in closed or open cells. Particularly this is true when the identify of the polymer and the conditions of cell formation are known. Otherwise the closed-cell content of a yieldable sample may be determined by the gas displacement method of Remington and Pariser, "Rubber World," May 1958, page 261, modified by operating at as low a pressure differential as possible to minimize volume changes of the yieldable closed cells. The closed cells of the instant foams, for maximum resiliency and shock absorption, should be fully reinflated, as discussed in detail in the process for their preparation.

Other resilient foam sheet products, such as the open-celled polyurethane foam sheets, depend on the elasticity and recovery of the polymer in the skeletal foam structure to provide the resiliency. However, to provide load support and shock protection equivalent to that of the pneumatic foam sheets of this invention, such open-celled foams of elastomer polymers must be prepared at greater thicknesses and/or at densities appreciably greater than 0.03 g./cc.

The cell walls per se of the products of the instant invention are of the nonuniform texture, in contrast to the ultramicrocellular structures described in Blades et al. U.S. Pat. No. 3,227,664. The thickness of the cell walls in the instant foam sheets varies in excess of ± 30 percent.

The products of this invention should be comprised of thermoplastic, noncross-linked polymer. This requirement arises through two separate considerations. First, cross-linked polymers in general are not suitable for use in the flash extrusion process by which the instant foams are prepared since they cannot be satisfactorily dissolved in the activating liquid. Secondly, a sheet product meeting all the other requirements of the products of this invention will not continue to exhibit superior tear strength if the polymer be cross-linked. It is thought that cross-linking may embrittle the cell walls, perhaps reducing their work-to-break value or perhaps destroying the mobility of the individual elements which otherwise allows these to migrate and cooperate in stress bearing.

The process of the present invention is an improvement over the process of Blades and White, U.S. Pat. No. 3,227,784, a flash extrusion process wherein a confined superheated solution of polymer in an activating liquid under certain special combinations of concentration and temperature is extruded abruptly into a region at lower pressure under conditions such that a controlled high number of bubble nuclei exist, whereupon flash evaporation of the activating liquid expands the system into a polyhedral-celled foam and simultaneously quenches the structure to freeze-in the shear-generated polymer orientation, all within a small fraction of a second. It has now been found that to generate products with large cells, the number of bubble nuclei existing at the moment of extrusion must be restricted. This is accomplished by careful control of the extrusion conditions, including omitting any deliberately added nucleating agents (including finely divided pigments, delustering agents, occluded gases, etc.) avoiding as much as possible adventitious nucleating agents such as dirt, gel particles, etc., regulating temperature and pressure conditions, and the extrusion orifice.

With respect to extrusion temperature, the process must meet the limitations of U.S. Pat. No. 3,227,784, of a solution having a temperature prior to extrusion (1) greater than the freezing point of the solution and (2) below that temperature where adiabatic evaporation of all the activating liquid present will produce insufficient cooling for solid polymer precipitation. In addition, however, in order to assure the production of microcellular foams the number of bubble nuclei must be restricted to less than $10^5$ per cc. of solution by extruding the polymer solution at a temperature below the self-nucleation temperature of the activating liquid. Furthermore, in order to prevent fibrillation and maintain the desired polyhedral closed-cell foam structure, the solution should be extruded at a temperature below its fibrillation temperature.

The self-nucleation temperature of the activating liquid is defined in U.S. Pat. No. 3,227,784, and is generally about 45° C. below the critical temperature of the activating liquid.

Figure 2:
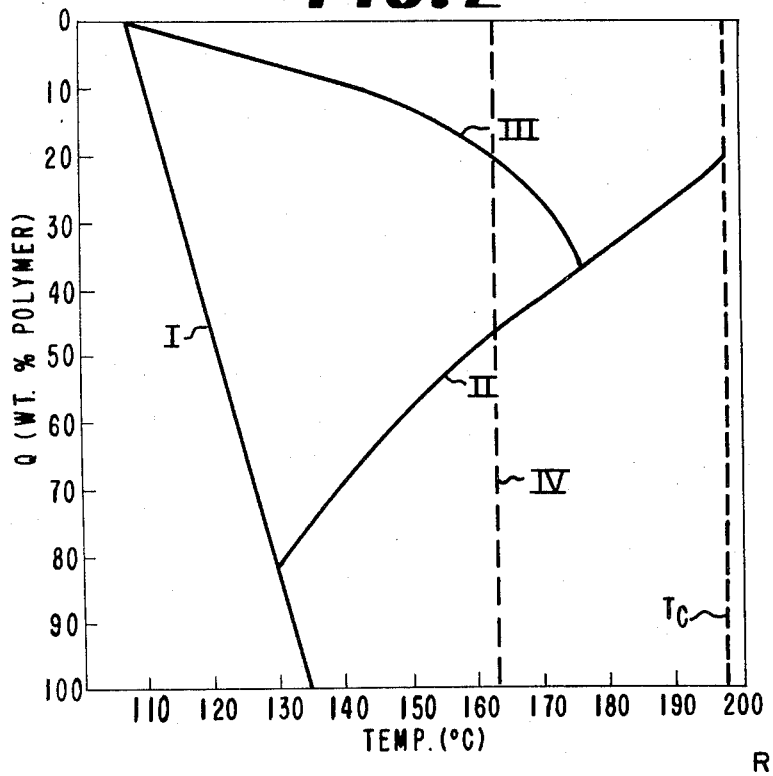
FIG. 2 represents a graphical definition of the suitable conditions of temperature and concentration for the specific combination of linear polyethylene and fluorotrichloromethane.
Figure 3:
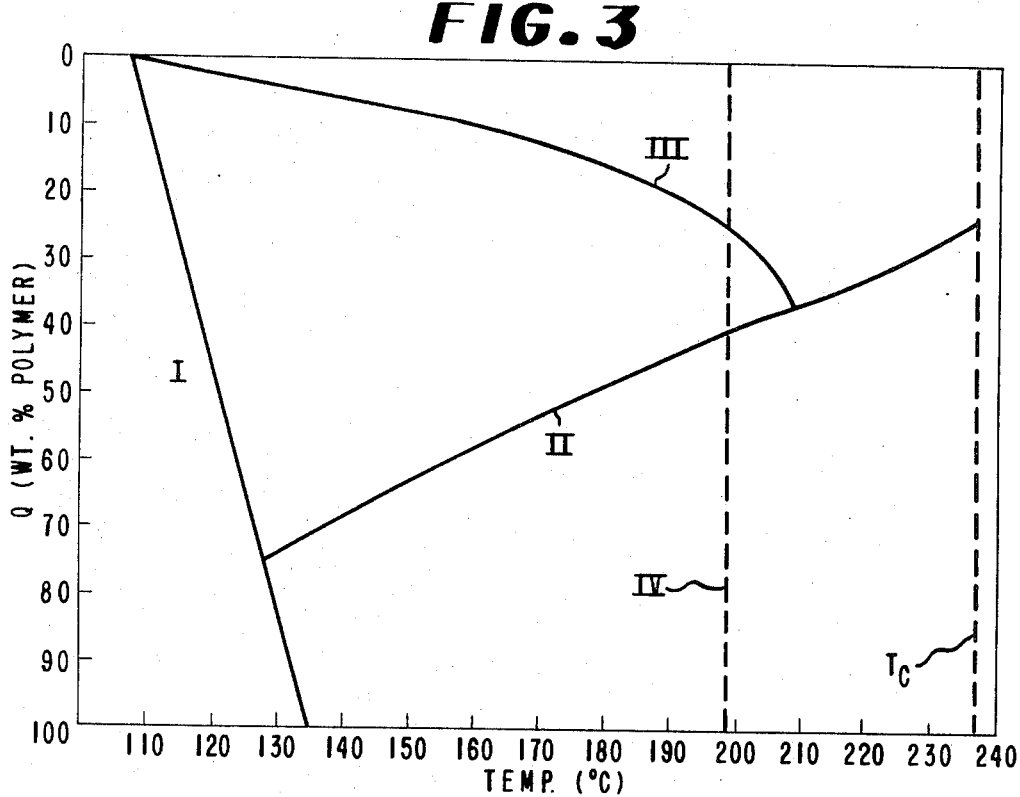
FIG. 3 represents a graphical definition of the suitable conditions of temperature and concentration for the specific combination of linear polyethylene and methylene chloride.
Figure 4:
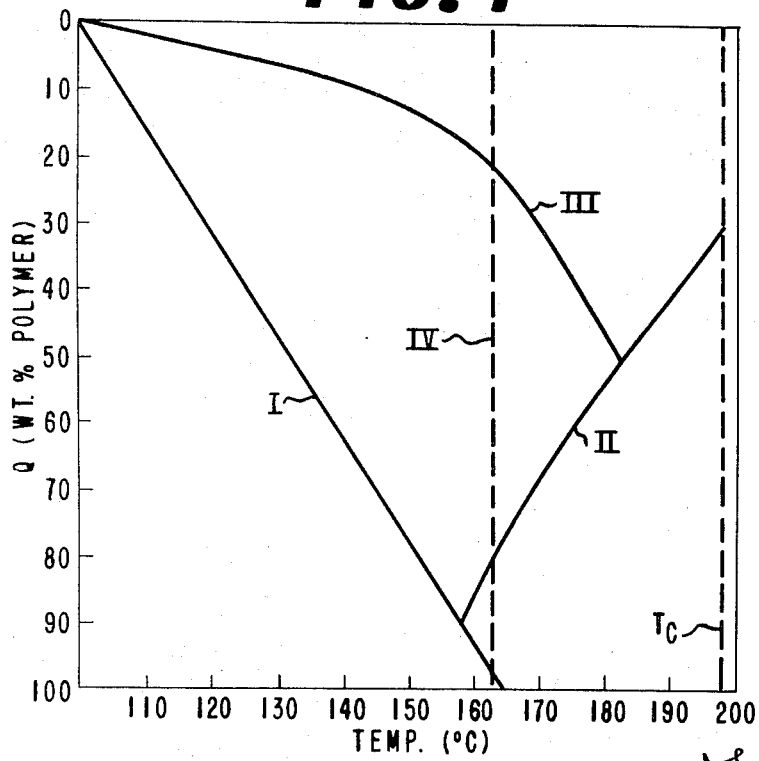
FIG. 4 represents a graphical definition of the suitable conditions of temperature and concentration for the specific combination of isotactic polypropylene and fluorotrichloromethane.
Figure 5:
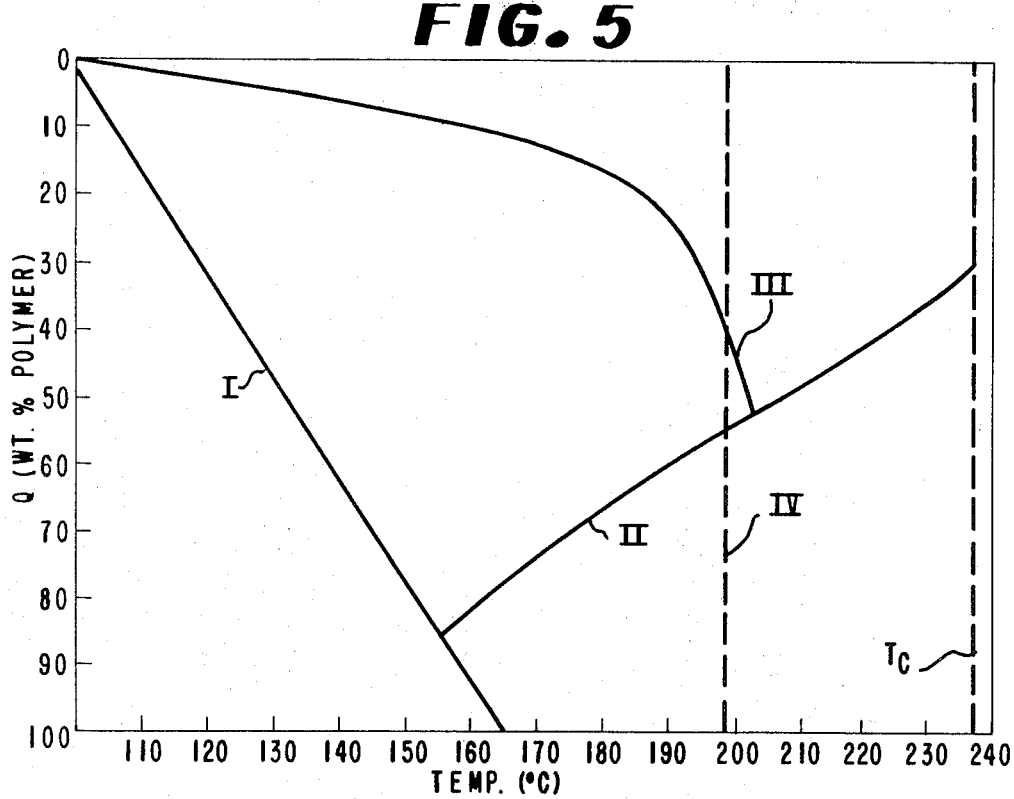
FIG. 5 represents a graphical definition of the suitable conditions of temperature and concentration for the specific combination of isotactic polypropylene and methylene chloride.
Figure 6:
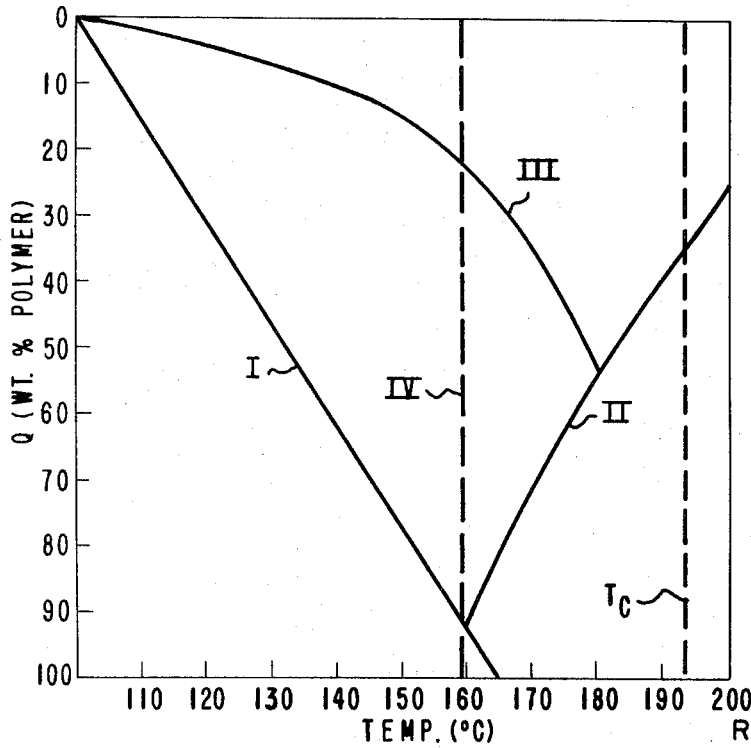
FIG. 6 represents a graphical definition of the suitable conditions of temperature and concentration for the specific combination of isotactic polypropylene and 90/10 mixture of fluorotrichloromethane/dichlorotetrafluoroethane.
Figure 7:
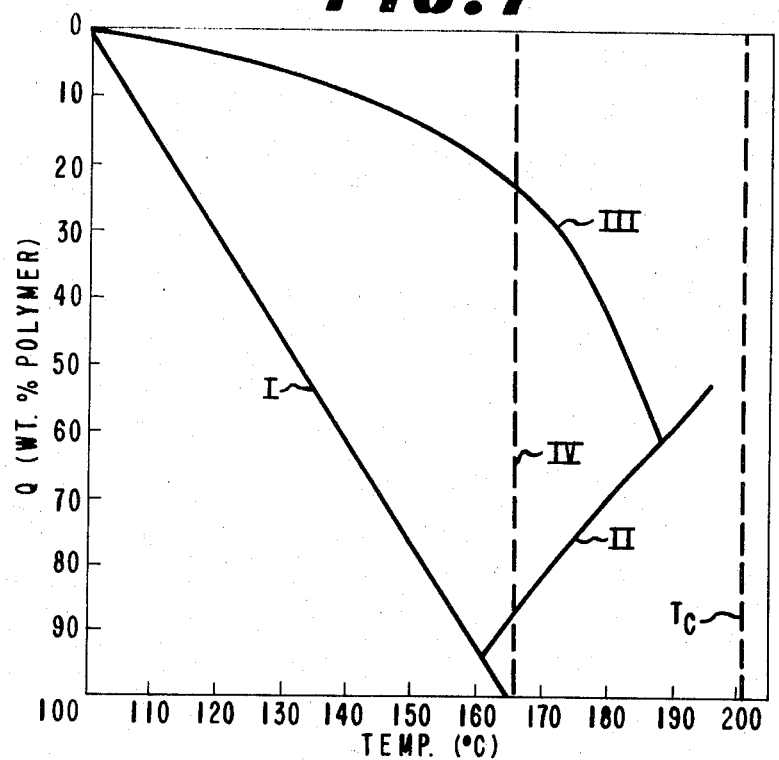
FIG. 7 represents a graphical definition of the suitable conditions of temperature and concentration for the specific combination of isotactic polypropylene and 91/9 mixture of methylene chloride/perfluorocyclobutane.

The fibrillation temperature of the solution at a given polymer concentration is the temperature at which, upon extrusion, the evaporation of the activating liquid causes appreciable rupture of the cell walls resulting in a predominately fibrillated foam structure. The fibrillation temperature may be determined in the manner described in U.S. Pat. No. 3,227,784, hereby incorporated by reference, at column 9, line 43 to column 10, line 16 therein. More specifically, observe FIGS. 3 and 2 wherein the fibrillation temperature at various concentrations is represented by curve III, for methylene chloride-linear polyethylene and fluorotrichloromethane-linear polyethylene, respectively.

Activating liquids which can be used in the present process should have the following characteristics: (a) The liquid should have a boiling point at least 25° C. and preferably at least 60° C. below the melting point of the polymer used; (b) the liquid should be substantially unreactive with the polymer during mixing and extrusion; (c) the liquid should be a solvent for the polymer at the extrusion conditions of temperature, concentration and pressure; (d) the liquid should dissolve less than 1 percent of high polymeric material at or below its normal boiling point in order to guarantee preservation of the molecular orientation of the polymer in the cell walls to be generated; (e) the liquid should form a solution which will undergo rapid vaporization upon extrusion, forming a nongel polymer phase (i.e., a polymer phase containing insufficient residual liquid to plasticize the structure). In the light of these characteristics, the activating liquids are quite restrictive. For the polymers employed in the present invention, such as linear polyethylene and isotactic polypropylene, typical examples of activating liquids meeting these specific requirements include methylene chloride, fluorotrichloromethane, pentane, hexane, and mixtures thereof, and combinations of these solvents with impermeant inflatants, such as sulfur hexafluoride; lower boiling halocarbons, e.g., perfluorocyclobutane; dichlorodifluoromethane 1,1,2-trichloro-1,2,3,-trifluoroethane; perfluoro-1,3-dimethylcyclobutane and perfluorodimethylcyclobutane isometric mixtures; and mixtures of the foregoing. The concentration of these inflatants must be low enough so as not to cause the excessive bubble nucleation that leads to small cell foams. At the same time, in most embodiments of the instant invention, it is preferable to have the inflatant concentration high enough to leave a sufficient quantity of the component in the newly formed cells for a sufficient length of time to cause spontaneous reinflation of the foam with air.

With the present polymer solution system, an inherent spontaneous transient collapse and spontaneous reinflation of the foam will occur. The activating liquid solvent vapor, during the flash extrusion, permeates through the cell walls and escapes from the cells at a rate faster than air permeates in to take its place, thus decreasing the internal gas pressure to the point where external atmospheric pressure crushes and collapses the cellular structure. The presence of an inflatant causes this collapsed condition to be only transient. The continued presence of an impermeant inflatant creates an osmotic pressure gradient which forces air to continue to diffuse into the partially collapsed cells to reinflate them.

The ability of collapsed microcellular structures to be capable of self-reinflation depends not only upon the particular configuration and construction of the cells but also upon the interaction of the confined impermeant inflatant and the synthetic polymer which forms the cell walls. Another factor which contributes to the self-reinflatable characteristic involves the permeant nature of air; more particularly, the ability of air to diffuse into the cells of the structure before the impermeant inflatant can diffuse outwardly therefrom. The cell walls are semipermeable such that air will osmotically diffuse from a high air partial pressure side of the wall through the wall to a low air partial pressure side of that wall until the respective fugacities are equal. At the same time, it has been found that the foam structures of the instant invention have cell walls of sufficient strength to withstand reinflation without any substantial degree of stretching.

The minimum quantity of an inflatant contained in each cell is of significance in realizing an adequate osmotic driving force to obtain reliable and reasonably rapid self-reinflation. Most of the cells should contain at least some impermeant inflatant. Since the inflatant must exist in a gaseous condition to create an osmotic driving force, it must be either a gas at room temperature or be capable of vaporizing at a temperature below the melting point of the synthetic polymer defining the walls. In practice, it has been found that the inflatant must be capable of generating a vapor pressure of at least 30 mm. Hg at a temperature of 25° C. in order to reliably provide well-defined cavities into which the external air will diffuse in reasonable periods of time. If the vapor pressure of the inflatant in the partially collapsed cells is at least 30 mm. at room temperature, the structure will normally self-inflate upon exposure to the atmosphere.

The rate of permeation for an inflatant through a given polymer increases as its diffusivity and solubility increase. Accordingly, candidates for impermeant inflatants should have as large a molecular size as is consistent with the required 30 mm. minimum vapor pressure, and have little solvent power or affinity for the confining polymer cell walls.

It has been found that the total amount of inflatant in the activating liquid system preferably should not exceed 10 percent by weight based on the weight of the polymer solution. While solvent systems other than those described above can be used in the process of the instant invention, care should be exercized in their selection so as to prevent a depreciation of the foam product. For example, the substitution of certain high heat of vaporization alcohols, to aid in quenching the foam structure, for all or portions of the above solvent systems leads to foams of considerably reduced toughness.

Especially preferred activating liquids are a 10/1 mixture of methylene chloride/perfluorocyclobutane (critical temperature, 200° C.) and a 90/10 mixture of fluorotrichloromethane/dichlorotetrafluoroethane (critical temperature, 193.5° C.), both proportions being expressed on a weight basis.

Figure 8:
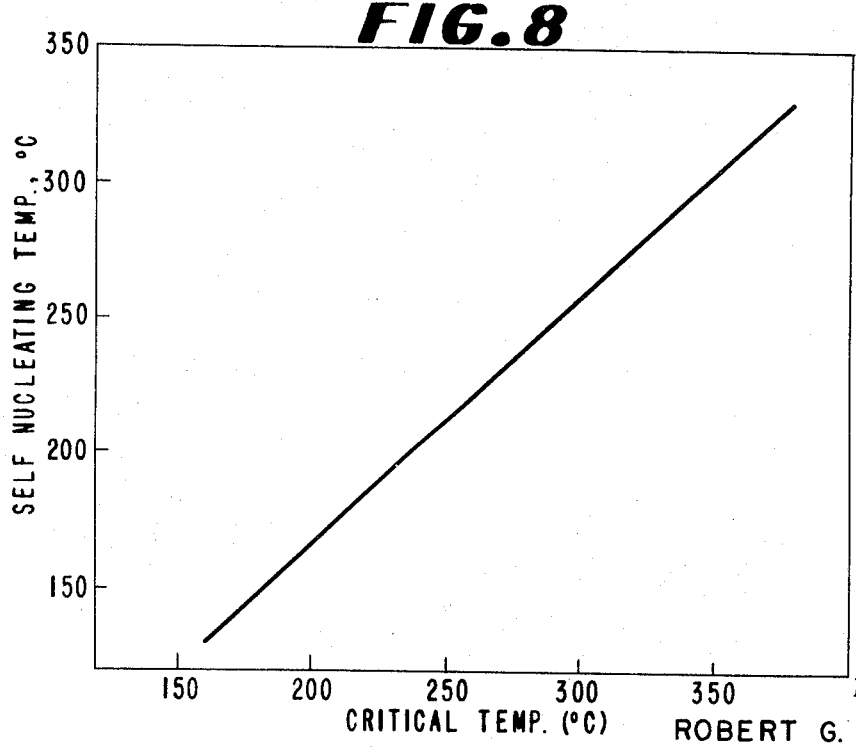
FIG. 8 is a graphical illustration of the relationship between calculated values of the self-nucleating temperature and the critical temperature for a number of activating liquids.

Calculated values of the self-nucleating temperature ($T_n$) as outlined in U.S. Pat. No. 3,227,784, were plotted against the critical temperature ($T_c$) for a number of activating liquids (FIG. 8). The resulting plot was a straight line. Accordingly, an empirical rule for predicting the self-nucleating temperature with reasonable accuracy was indicated:

$$T_n = 0.92 T_c - 19$$

A simpler but less accurate rule for the operation of the present invention is that if the solution temperature prior to extrusion is about 45° C. below the critical temperature of the activating liquid it will also be below the self-nucleation temperature.

It should be noted that, as expected, multiple component mixtures of the activating liquid have a self-nucleation temperature below that of the single component with the higher critical temperature.

The interdependence of the extrusion conditions can be readily seen from the diagrams given for a number of polymer/activating liquid systems in FIGS. 2 through 7. Curve I represents the freezing point of homogeneous mixtures of polymer and activating liquid. Conditions to the left of curve I represent solid/liquid phase systems which cannot be satisfactorily extruded. Curve II is defined as the sintering line. Products obtained from conditions below curve II are "sintered" and do not have the orientation of the products of this process. Curve III denotes the fibrillation line above which the combination of conditions give fibrillated products. Curve IV stands for the self-nucleation temperature ($Tn$) line. Extrusion temperatures higher than the self-nucleation temperature result in a rate of bubble nucleation exceeding $10^5$ nuclei/cc., and thus give foam with a median cell diameter below 500 microns. Line $Tc$ stands for the critical temperature of the given activating liquid system. Thus the area bounded by curves I, II, III and IV defines the initial conditions of solution temperature and concentration which, in conjunction with other requisite process factors herein described, will produce the microcellular structures of the present invention.

Accordingly, a desirable range of operating conditions for a number of polymer/activating liquid combinations is as follows. The solution temperature prior to extrusion should be within the range of 125° to 170° C., and preferably between 130° to 150° C. Operating within this range essentially assures that the bubble nuclei formation will be less than $10^5$ per cc., since the temperature will be considerably below the self-nucleation temperature of the activating liquid. Also, operating in this temperature range maintains the solution below the fibrillation temperature, thus promoting closed-cell foam structures.

The solution concentration, should be within 25 to 70 percent by weight polymer and preferably 40 to 60 percent.

The system pressure prior to extrusion should be greater than the vapor pressure of the solution, up to hydrostatic pressures in the order of 1,000 p.s.i.

The primary consideration in selecting the specific pressure conditions prior to extrusion and in the region into which the solution is extruded is that the pressure drop between the two is such that less than $10^5$ bubble nuclei per cc. of solution are produced upon extrusion. There is an optimum pressure drop for a desired foam product, and the pressure drop effects the balance of final foam physical properties. Higher pressures and a correspondingly higher pressure drop tend toward increased nucleation, since the size of the pressure drop effects the shear stress and shear rate, producing shear nucleation.

In order that the vapor from the activating liquid be efficient in generating a foam instead of escaping ineffectively to the atmosphere, the gap width of the annulus should not be designated too small. When the gap width becomes smaller than the average distance between bubble nuclei in the solution being extruded, a large fraction of the vapor will be lost from the surface instead of generating internal foam bubbles. The product densities are thus observed to increase as the ratio of (gap width)/(bubble nuclei spacing) decreases. The average distance between bubble nuclei in the solution $d$ may be approximated by $$d = D(\rho f/c \rho s)^{1/3}$$

where $D$ = average cell diameter in foam product
$\rho f$ = density of foam product
$c$ = weight fraction of polymer in solution
$\rho s$ = density of solution In light of the foregoing, the polymer solution, under applicable conditions of temperature, concentration and pressure, is conveniently extruded through an annular die into a region of substantially lower pressure and temperature under such conditions that a controlled number of bubble nuclei exist at the extrusion annulus. Under these conditions, the product has a natural tendency to form pleats, which is considered undesirable can be counteracted, for example, by "blown film" techniques. The tube can be subsequently slit and opened to a single thickness.

Laminates of the foam sheets with polymeric films can be made by various laminating techniques such as melt or extrusion lamination, by lamination with either water-based adhesive dispersions or solvent based adhesives of the natural and synthetic rubber types where the adhesive is applied to either the foam sheet or plastic film which are subsequently pressed together. Of the various methods, the melt lamination technique is preferred.

Suitable melt adhesives for adhering the foam sheet to the plastic film include polyethylene resins, particularly the so-called low-density polyethylene resins having a density in the range of about 0.91 to about 0.94 grams/cc. at 25° C., as well as copolymers of ethylene with vinyl esters such as ethylene/vinylacetate copolymer or copolymers of ethylene with various alkyl acrylates and acrylic acids such as ethylene/methylacrylate or ethylene/methacrylic acid copolymers. Low-melting copolyamides can also be used.

The foam sheets of the instant invention exhibit substantially balanced tear strength in both the machine and transverse directions, and have a specific work-to-tear value of at least 250 in.-lbs./in.$^2$. These properties, together with their flexibility, resiliency, softness, low density and low cost, preeminently suit these foams for a wide variety of uses.

For example, the foam products of the present invention can be used as a cushioning in applications such as shipping furniture, as athletic padding, veterinary padding, boat bumpers, padding for loading and boat docks, cushioning liners for shipping tubes, cushioning sleeves for shipping of bottles, cushion wraps for shipping of electronic parts, in packaging bottles to replace carton dividers, cushioning cut flowers, fruits, and vegetables, cushioning for floor padding, in automotive uses, headliners, side panels, truck insulation, seat cushions, disposable stadium cushions, gym floor mats, wall cushioning, and the like.

The foam structure can be laminated to one or both surfaces of various other layers as indicated including paper, paper board, wood, metal sheet, foil, plastic sheet and film, woven and nonwoven fabrics, other foams, glass, leather, rubber sheeting, and the like. Typical uses for such laminates include use as disposable bath mats, crib pads, auto trunk mats, playpen pads, quilted fabrics, place mats, table cloths, closet bags, upholstery, luggage, wall covering, rain wear, leather replacement, frozen food carton overwraps, insulating wrap for shipping flowers, insulation in sleeping bags, and cold weather wear, outdoor mattress, shipping bags and envelopes for food and fragile materials, mailing bags for books, grocery bags for frozen food, ice cube bags, cushioned packaging shapes such as for egg trays or boxes, cushioned labels, fruit separators, candy trays, disposable mattress protectors, shelf and drawer lining, shoe lining, slip preventative backing for throw rugs, kneeling cushions for outdoor or indoor work and cushioning partition for packaging glassware.

The foam sheet used either alone or laminated to another structure such as a film can be used for various insulation purposes such as insulating hot and cold water pipes, air ducts, automotive insulation, as an overwrap for frozen food cartons, packaging of refrigerated foods, insulating wrap for shipping flowers, in sleeping bags and cold weather wear, and as an outdoor mattress.

In the following examples, which further illustrate the instant invention, parts and percentages are by weight.

Example 1

Sheet products are prepared from isotactic polypropylene and 90/10 fluorotrichloromethane/dichlorotetrafluoroethane. 37.5 pounds of isotactic polypropylene (Hercules' "Profax 6823," melt flow rate 0.4, density 0.91 g./cc. is melted at approximately 175° C. at a rate of 0.60 lbs./min. in a 2½-inch diameter 24/1 L/D ratio Waldron Hartig thermoplastic extruder (Model No. 25T24), equipped with a screw comprised of feed, melt and meter sections. Molten polymer is discharged from this extruder at a temperature of approximately 200° C. and into another extruder of the same model except that the screw is comprised of a feed section and a mixing section of the torpedo type. This second extruder serves as a mixing and cooling device. 33.8 pounds of fluorotrichloromethane (commercially available from E. I. du Pont de Nemours and Company as "Freon-11") and 3.8 pounds of dichlorotetrafluoroethane (commercially available from E. I. du Pont de Nemours and Company as "Freon-114") are injected into the molten polymer in the second extruder at the entrance to the mixing section at a rate of 0.54 and 0.06 lbs./min., respectively. The polymer solution (50% polymer/45% Freon-11/5% Freon-114) is thoroughly mixed and cooled in the second extruder to a final solution temperature of 149° C. The well-mixed, homogeneous solution is pumped into a 10-gallon pressure vessel at 600 p.s.i.g. Then the polymer is continuously extruded through a 3.25-inch diameter annular die, having a die gap of 0.0125 inch and a land length of 0.3125 inch at a solution temperature of 140° C. A pressure of 600 p.s.i.g. is maintained above the die land. A foam tube is formed at an extrusion velocity of approximately 235 yards per minute and is blown to a final diameter of 17 inches. This tube is subsequently slit and opened to a single-thickness sheet.

This sheet product is comprised of polyhedral closed cells whose median diameter is 960 microns. The density of the reinflated foam is 0.016 g./cc. and the basis weight is 0.77 oz./sq. yd. From these data, equation (3) predicts a work-to-tear of about 0.54 in.-lbs. for the 1¼-inch tear length of the standard sample size, in excellent agreement with the experimentally measured value of 0.55 in.-lbs. The corresponding specific work-to-tear value is 400 in.-lbs./in.$^2$. The calculated value of the average distance between bubble nuclei is about 0.010 inch, so that an even lower density product would be expected if a larger die gap were to be employed.

Experimental values of work-to-tear are determined on samples conditioned at least 16 hours at 70° F. and 65 percent RH. Test samples 2.25 inches × 2 inches are cut from the sheets and weighed to determine basis weight (oz./yd.$^2$), the long dimension of the sample corresponding to the transverse direction of the sheet. A 1-inch long slit is cut perpendicular to one of the 2-inch sides at its midpoint. One of the "legs" on each side of this slit is clamped in each jaw of an Instron Tester such that the slit-defined edge is at the center of the jaw. A nominal gauge length of 1 inch is used. The stress-strain curve to failure is recorded as the jaws are separated at a rate of 10 inches per minute. The area under the curve is the work-to-tear of the sample for a nominal tear length of 1¼ inches. A minimum of three test samples is to be run for each sheet, and the results averaged.

The work-to-tear values of these sheets are remarkably high considering their low basis weight, and, along with their other desirable properties such as high tensile strength, flexibility, pneumaticity, etc., eminently suits them for protective wrapping uses. The polymer in the cell walls of these samples has uniplanar orientation and is of nonuniform texture.

Example 2

A sheet product according to this invention is prepared from linear polyethylene and a 90/10 fluorotrichloromethane/dichlorotetrafluoroethane activating liquid. Using the extrusion equipment described in example 1, 37.5 pounds of linear polyethylene (Du Pont's "Alathon–7320," melt index 1.2, density 0.95 g./cc.) is melted at 155° C. at a rate of 1.00 lbs./min. 63 pounds of fluorotrichloromethane is injected into the polymer at a rate of 1.68 lbs./min. Seven pounds of dichlorotetrafluoroethane is also injected into the polymer at 0.19 lbs./min. The solution (approximately 35 percent polymer by weight) is mixed and cooled in the torpedo mixer to a final solution temperature of 130° C. The solution is pumped into a 10-gallon pressure vessel at 600 p.s.i.g. Then the solution is continuously extruded through a 3.0 inch diameter annular die having a die gap of 0.010 inch and a land length of 0.060 inch at a temperature of 130° C. and pressure of 600 p.s.i.g. A foam tube 3 inch in diameter is formed and blown to a final diameter of 15 inch.

The sheet product exhibits polyhedral, closed cells whose median diameter is 1,370 microns. The density of the reinflated foam is 0.020 g./c.c. and the basis weight of 0.88 oz./sq. yd. The calculated work-to-tear of 0.97 in.-lbs. is again in good agreement with the experimental value of 1.4 in.-lbs. The specific work-to-tear value is 900 in.-lbs./in.$^2$.

Portions of this foam sheet are cross-linked by exposing the sample of 2 Mev. electron irradiation from a Van de Graaff accelerator for doses of 10 megarads and 20 megarads, respectively. The work-to-tear is observed to fall to 0.8 and 0.25 in.-lbs., respectively, as a result of cross linking the polymer.

Example 3

A foam sheet is prepared using a 10/1 by weight mixture of methylene chloride/perfluorocyclobutane as an activating liquid. Using the extrusion equipment described in example 1, 37.5 pounds of isotactic polypropylene (Hercules' "Profax 6623," melt flow rate 2.0, density 0.91 g./cc. is melted at 175° C. at a rate of 0.73 lb./min. 41.6 pounds of methylene chloride is injected into the polymer at 0.81 lb./min. along with 4.2 lbs. of perfluorocyclobutane at the rate of 0.08 lb./min. The solution (approximately 45 percent polymer by weight) is mixed and cooled in the mixer to a final solution temperature of 150° C. The solution is pumped into a 10-gallon pressure vessel at 600 p.s.i.g. Then the polymer solution is continuously extruded at a temperature of 150° C. and pressure of 300 p.s.i.g. through a 3.25-inch diameter annular die having a die gap of 0.0075 inch and a land length of 0.1875 inch. The 3.25-inch diameter foam tube generated is blown to a final diameter of 15 inches.

The sheet product has polyhedral closed cells whose average diameter is 750 microns. The density of the reinflated foam is 0.017 g./cc. and the basis weight is 0.48 oz./sq. yd. The experimental value of work-to-tear is 0.32 in.-lbs. The specific work-to-tear value is 375 in.-lbs./in.$^2$.

Example 4—Comparative Example

The procedure of example 3 is repeated, except that small quantities of nucleating agents are added to the extrusion solution. 37.5 pounds of isotactic polypropylene (Hercules' "Profax 6823") is melted at 175° C. in a 2-inch diameter melt extruder at a rate of 0.21 lb./min. 41.6 pounds of methylene chloride containing 1 percent by weight of a finely divided silica aerogel (Monsanto's "Santocel 54") and 1 percent butyl alcohol as a dispersing agent is injected into the polymer at 0.23 lb./min. 4.2 pounds of perfluorocyclobutane is also injected into the polymer at 0.02 lb./min. The solution (approximately 45 percent polymer by weight) is mixed and cooled in the extruder to a final solution temperature of 140° C. and pumped into a 10-gallon pressure vessel at 600 p.s.i.g. Then the polymer solution is continuously extruded through a 2.0-inch diameter annular die having a die gap of 0.005 inch and a land length of 0.200 inch. The extrusion temperature is 140° C. and the pressure is 600 p.s.i.g. A foam tube, 2.0 inch in diameter, is generated and blown to a final diameter of 7.5 inches.

In spite of the use of an even lower extrusion temperature than that of example 3 (which would favor even larger cell sizes), the small quantity of nucleating agents added leads to a product having polyhedral cells whose average diameter is only 87 microns. The density of the foam is 0.021 g./cc. and the basis weight of 0.55 oz./sq. yd. The calculated work-to-tear is only 0.04 in.-lbs. in good agreement with the experimental value of 0.06 in.-lbs. The specific work-to-tear value is 62 in.-lbs./in.$^2$.

Examples 5 to 16

Following the general procedure of examples 1 to 3, foamed sheet products are prepared under the conditions listed in table I below. With the exception of example 14, in which the amount of dichlorotetrafluoroethane is too high, the result is the low-density, low-basis weight product of the present invention.

TABLE I

| Example | Polymer polypropylene,[1] weight percent | Activating fluorotrichloromethane | Liquid, weight percent dichlorotetrafluoroethane | Temperature, °C. | Pressure, p.s.i. | Die geometry gap in L/G[2] | | Density, grams/cc.[2] | Basis weight, oz./yd.[2] |
| --- | --- | --- | --- | --- | --- | --- | --- | --- | --- |
| 5 | 45 (4) | 55 | | 130 | 500 | 0.0075 | 25 | 0.019 | 0.53 |
| 6 | 37.5 (4) | 56.25 | 6.25 | 125 | 700 | .0125 | 25 | .013 | .80 |
| 7 | 30 (4) | 63 | 7 | 140 | 400 | .0085 | 21 | .011 | .55 |
| 8 | 45 (4) | 49.5 | 5.5 | 140 | 500 | .0075 | 35 | .015 | .62 |
| 9 | 52.5 (4) | 42.75 | 4.75 | 145 | 500 | .0085 | 21 | .018 | .49 |
| 10 | 45 (4) | 49.5 | 5.5 | 145 | 480 | .0075 | 15 | .018 | .57 |
| 11 | 45 (4) | 49.5 | 5.5 | 145 | 800 | .0075 | 45 | | .47 |
| 12 | 45 (4) | 49.5 | 5.5 | 135 | 320 | .0125 | 25 | .009 | .43 |
| 13 | 45 (4) | 45 | 10 | 135 | 400 | .0075 | 25 | .011 | .52 |
| 14 | 45 (4) | 38.5 (3) | 16.5 (4) | 140 | 500–700 | .0075 | 25 | Small cell foam | |
| 15 | 45 (2) | 49.5 (3) | 5.5 (5) | 155 | 400 | .0075 | 25 | .019 | .40 |
| 16 | 45 (4) | 45 | 10 | 140 | 540 | .0050 | 26 | .021 | .50 |

[1] Hercules' "Profax 6523" except in Example 6 (6823) and Example 15 (6623).
[2] Land length per gap width numbers in parentheses = melt flow rate (ASTM-D1238).
[3] Methylene chloride.
[4] Dichlorotetrafluoroethane.
[5] Dichlorodifluoromethane.

Examples 17 to 22

Polymeric films are treated for adherability by subjecting them to electrical discharge following the general procedure described in U.S. Pat. No. 3,018,189. A foam sheet, made as described in example 1, and the plastic film are fed into the nip of a melt laminator. A polyethylene resin of melt index approximately 4.0 and a density of 0.917 g./cc. at 25° C., is extruded at approximately 315° C. into the nip formed between the foam sheet and the film on an Egan Extrusion Coating Machine (Frank W. Egan & Co.) provided with a second winding station to permit lamination. The thickness of the adhesive layer between the foam sheet and the plastic film is in all cases about 0.5 mil. The foam sheet and plastic film are fed into the laminator at approximately 150 ft./min. The nip pressure is approximately 50 pounds per inch of width. The temperature of the quench roll is held at approximately 5° C.

The resulting foam/film laminates are characterized with respect to their performance on the stress-flex, bag drop, abrasion resistance and pinhole flex tests, which are simulative of in-use performance. Results are summarized in table II. In general, the performance of the laminar structures in these tests is considerably better than the performance of either the film or the foam sheet, especially in the pinhole flex life and abrasion tests.

The *stress-flex* test is carried out as described by H. C. Horst and R. E. Martin, Modern Packaging, March, 1961, page 123.

The *bag drop* test is carried out by making an envelope of the laminate, filling the envelope with 1 pound of rice, sealing the envelope and then dropping it from a height of 24 inches and noting the number of drops that are sustained before rupture. The filled envelope is conditioned at the temperature at which the test is to be carried out, in this case at 0° F. and at 72° F.

The *abrasion resistance* test is carried out on a Taber Abraser (Taber Instrument Corp.) using a 500-gram load on a CS17 abraser wheel. The abrasive action is continued (film surface exposed on the laminate) until evidence of breakdown of the sample is noted. The result is expressed in terms of cycles.

The *pinhole flex test* is carried out as described by D. W. Flierl, Modern Packaging 25,129 (1951).

TABLE II

| | | Stress flex | | | | Bag drop | | | | Abrasion resistance | Pinhole flex life | |
| --- | --- | --- | --- | --- | --- | --- | --- | --- | --- | --- | --- | --- |
| | | 0° F. | | 72° F. | | 0° F. | | 72° F. | | | | |
| Example | Structure | MD | TD | MD | TD | MD | TD | MD | TD | | MD | TD |
| 17 | FS/PET | 181 | 177 | 295 | 314 | 100 | 100 | 100 | 100 | 1,500 | 1,089 | 336 |
| | PET | 64 | 40 | 106 | 174 | 25 | 9 | 12 | 1 | 710 | 4 | 4 |
| | FS | 1 | 1 | 1 | 1 | 1 | 1 | 1 | 1 | | | |
| 18 | FS/NY | 255 | 30 | 226 | 143 | 1 | 100 | 40 | 100 | 1,500 | 465 | 445 |
| | NY | 16 | 7 | 49 | 57 | 1 | 1 | 29 | 7 | 1,500 | 118 | 80 |
| | FS | 1 | 1 | 1 | 1 | 1 | 1 | 1 | 1 | | | |
| 19 | FS/PP | 864 | 980 | 2,000+ | 2,000+ | 100 | 100 | 100 | 100 | 1,500+ | | |
| | PP | 2,000+ | 2,000+ | 2,000+ | 2,000+ | 100 | 74 | 100 | 75 | 660 | | |
| | FS | 1 | 1 | 1 | 1 | 1 | 1 | 1 | 1 | | | |
| 20 | FS/VC | 10 | 6 | 45 | 48 | 9 | 3 | 35 | 45 | 1,500+ | 309 | 423 |
| | VC | 2 | 2 | 7 | 17 | 1 | 1 | 5 | 4 | 390 | 1 | 2 |
| | FS | 1 | 1 | 1 | 1 | 1 | 1 | 1 | 1 | | | |
| 21 | FS/PVF | 574 | 491 | 1,218 | 854 | 100 | 100 | 100 | 100 | 1,500+ | | |
| | PVF | 872 | 705 | 1,545 | 1,418 | 100 | 100 | 100 | 100 | 510 | | |
| | FS | 1 | 1 | 1 | 1 | 1 | 1 | 1 | 1 | | | |
| 22 | FS/BPE | 155 | 609 | 126 | 711 | 70 | 41 | 100 | 100 | 480 | | |
| | BPE | 3 | 56 | 2 | 8 | 1 | 2 | 1 | 8 | 160 | | |
| | FS | 1 | 1 | 1 | 1 | 1 | 1 | 1 | 1 | | | | a. Legend
PE—Polyethylene
PET—Biaxially oriented heat-set polyethylene terephthalate film
NY—Polycaprolactum film
FS—Foam sheet
PP—Biaxially oriented polypropylene film
VC—Vinylidene chloride copolymer coated cellophane
PVF—Biaxially oriented polyvinyl fluoride film
BPE—Branched polyethylene film
b. Tests run to 100 drops maximum
c. Tests run to 1,500 cycles maximum

I claim:

1. A foam sheet of a linear, thermoplastic, crystalline polymer of film forming molecular weight and substantially free from cross-linking the polymer having a work-to-break value of at least 10,000 in.-lbs./in.³, said foam sheet consisting essentially of polyhedral shaped closed cells whose median diameter is at least 500 microns, the cell walls being characterized by a nonuniform texture, and the foam having a maximum density of 0.03 g./cc.

2. A foam sheet of claim 1 wherein the median diameter of said closed cells is at least 1,000 microns, said cells have a wall thickness of from about 0.5 to about 3.0 microns and wherein said cells are substantially fully reinflated with air.

3. A foam sheet of claim 1 having a maximum density of 0.015 g./cc.

4. A foam sheet of claim 1 wherein said polymer is a polyhydrocarbon.

5. A foam sheet of claim 1 wherein said polymer is isotactic polypropylene.

6. A foam sheet of claim 1 wherein said polymer is linear polyethylene.

7. A foam sheet of claim 1 having at least one polymeric film bonded thereto.

* * * * *

UNITED STATES PATENT OFFICE
CERTIFICATE OF CORRECTION

Patent No. 3,637,458         Dated January 25, 1972

Inventor(s) Robert Guy Parrish

It is certified that error appears in the above-identified patent and that said Letters Patent are hereby corrected as shown below:

Column 1, line 21, "food" should read --good--.
    Column 1, line 45, "0.30" should read --0.03--.
    Column 5, lines 60 and 61, "1,1,2-trichloro-1,2,3,-trifluoroethane" should read --1,1,2-trichloro-1,2,2-trifluoroethane--.
    Column 10, line 11, "of" should read --to--.

Signed and sealed this 5th day of December 1972.

(SEAL)
Attest:

EDWARD M. FLETCHER, JR.
Attesting Officer

ROBERT GOTTSCHALK
Commissioner of Patents